March 9, 1954     H. E. EVERHARD     2,671,628
FLOWER AND SPRAY HOLDER
Filed Oct. 27, 1949

Inventor
HOMER E EVERHARD
By Harvey + O'Connell
Attorneys

Patented Mar. 9, 1954

2,671,628

UNITED STATES PATENT OFFICE 2,671,628

FLOWER AND SPRAY HOLDER

Homer E. Everhard, Wadsworth, Ohio

Application October 27, 1949, Serial No. 123,885

1 Claim. (Cl. 248—151)

This invention is a device for use largely by florists for the purpose of holding flowers and sprays or other forms of floral designs for decorating caskets, or as a flower basket.

The device of my invention is a knock-down structure comprising a container and supporting legs thereof detachably connected therewith so that the container may be used either with the supporting legs for positioning on a casket, or without the legs as a handle-equipped floral basket.

The invention together with its objects and advantages will be best understood and appreciated when the following detailed description thereof is read with reference to the accompanying drawings in which are illustrated preferred embodiments of the invention, and wherein.

Figure 1:
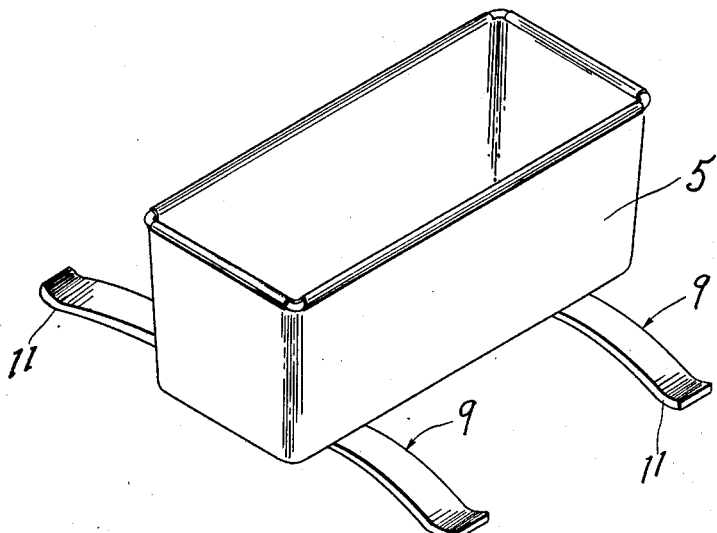
Figure 1 is an enlarged perspective view of one form of flower and spray holder embodying the features of this invention.

Referring now in detail to the drawing, the numeral 5 indicates a container. Preferably the container 5 is formed of metal and is adapted to contain water to prevent wilting of the flowers placed therein. Also, the container is tapered as shown so that a plurality of the containers may be nested for storage and shipping purposes.

The container 5 has secured to the bottom wall thereof exteriorly of the container, spring clips 6. Each of the clips 6 is formed from a single blank of resilient metal or other material, cut, shaped and dimensioned to provide for the clip a substantially flat rectangular body portion 7 and an integral resilient jaw 8 offset from the body 7, as shown to advantage in Figure 3.

Figures 2, 3:
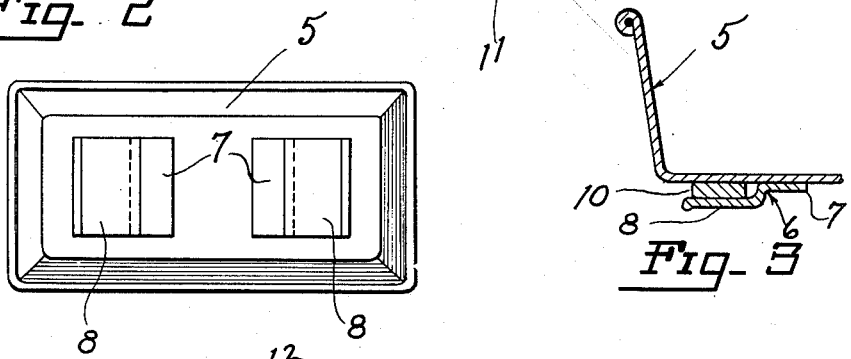
Figure 2 is a bottom plan view on a reduced scale of the receptacle forming part of the invention.
Figure 3 is a fragmentary detailed sectional view showing the manner in which the supporting legs are detachably connected with the container.
Figure 4:
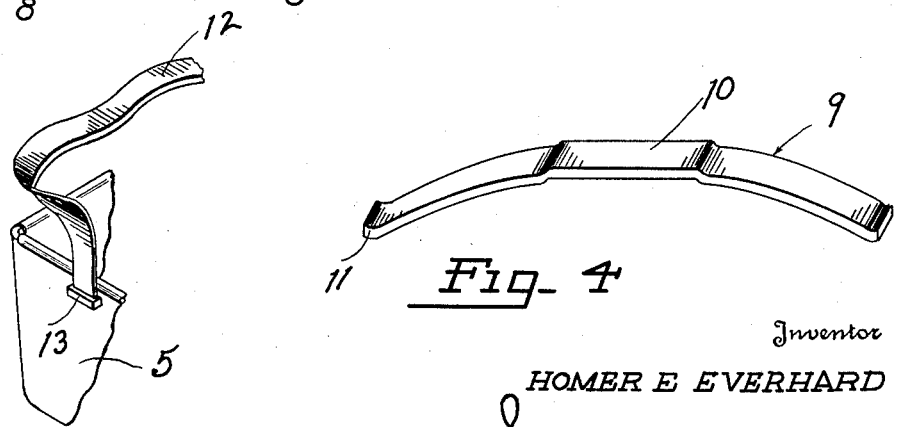
Figure 4 is a perspective view of one of the supporting legs.

As shown in Figure 2, the clips 6 are disposed on the underside of the container 5 and extend transversely thereof in longitudinally spaced relation; the body portions 7 of the clips being welded or otherwise permanently secured to the container.

For disposition transversely of the container 5 and to support the latter in stable condition upon a casket, grave site, or other surface, there are provided supporting legs 9. Each of the legs 9 is formed from a single length of resilient metal. Preferably each leg 9 is longitudinally bowed or curved and intermediate its ends is offset upwardly to provide a raised intermediate portion 10 that is adapted to be positioned between the jaw 8 of a clip 6 and the bottom wall of the container 5, whereby the supporting legs are detachably and frictionally engaged with the container for supporting the latter in the manner just stated. It may also be noted that each leg 9 has ends thereof slightly bent upwardly as at 11 so as to eliminate sharp edges as might cause scratching or other injury to the surface finish of a casket or the like upon which the flower and spray holder may be disposed.

It will be apparent that when the container 5 is equipped with the legs 9 in the manner just described and illustrated, it may be used to advantage for holding cut flowers or floral designs on the top of a casket or the like, the legs 9 extending transversely of the container 5 and beyond the container at opposite sides of the latter providing a stable support for the device regardless of the surface contour of the top of the casket.

Figure 5:
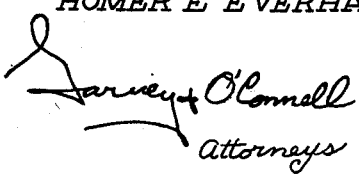
Figure 5 is a fragmentary perspective view showing an alternate form of the invention; and as provided to function as a floral basket.

When it is desired to use the device as a basket for holding cut flowers and the like, the legs 9 may be readily dispensed with and the container 5 equipped with a suitable handle 12. Preferably the handle 12 is formed from a single length of metal and is of an ornamental design. In general, the handle is substantially U-shaped and the legs thereof are secured at their terminals to opposite end walls of the container 5 in any suitable manner as indicated at 13 (Fig. 5). It will be understood that the handle 12 may be either permanently secured to the container 5 or detachably connected thereto, as may be found desirable.

Whether used either as a holder for flowers for disposition upon a casket or as a basket for floral designs, the container 5 of the device is provided with a supply of water to prevent wilting of the flowers and other components of the spray or floral design.

It is also contemplated by this invention that the container 5, supporting legs 9 and holder 12 will be suitably surface ornamented, as, for example, by having applied thereto a spray material so as to give the surfaces of the several components of the device the appearance of cloth or the like, and of various colors so that as a finished product the device will blend harmoniously with the casket or other details of the environment in which it may be used.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claim.

What I claim is:

A holder for displaying flowers, sprays and the like, comprising a receptacle having the general shape of a parallelepiped with an open top and a closed bottom, spaced spring clips attached to the under-face of the bottom having jaws spaced from but with a spring tendency toward the bottom, and leg members arranged in pairs of which each pair is formed of a continuous strip with the terminals bent downwardly and the intermediate portion raised, the raised portion being of the same length as the width of the clip jaw, said raised portion inserted between the jaw and the bottom of the receptacle to be removably retained thereby, the legs being directed downwardly so that the receptacle may be supported elevated from the supporting surface.

HOMER E. EVERHARD.

References Cited in the file of this patent

UNITED STATES PATENTS

| Number | Name | Date |
|---|---|---|
| D. 83,006 | Potter | Jan. 6, 1931 |
| 422,484 | Yarnell | Mar. 4, 1890 |
| 466,932 | Cornell | Jan. 12, 1892 |
| 580,423 | Pierson | Apr. 13, 1897 |
| 836,555 | Birnie | Nov. 20, 1906 |
| 922,125 | Friedrich | May 18, 1909 |
| 981,025 | Stapp | Jan. 10, 1911 |
| 1,101,286 | Jones | June 23, 1914 |
| 1,415,782 | Brace | May 9, 1922 |
| 1,631,409 | Finn | June 7, 1927 |
| 1,792,007 | Engberg et al. | Feb. 10, 1931 |
| 2,553,908 | Forman | May 22, 1951 |
| 2,560,486 | Shears | July 10, 1951 |